Sept. 8, 1959        F. NELSON        2,903,099

VENTILATED WHEEL BRAKE

Filed July 24, 1957        3 Sheets-Sheet 1

INVENTOR.
FREDERICK NELSON
BY

*Gunter A. Loreff*

ATT.

Sept. 8, 1959     F. NELSON     2,903,099
VENTILATED WHEEL BRAKE
Filed July 24, 1957     3 Sheets-Sheet 3

INVENTOR.
FREDERICK NELSON
BY
Gustav A. Wreff
ATT

2,903,099
VENTILATED WHEEL BRAKE
Frederick Nelson, Lakewood, Ohio

Application July 24, 1957, Serial No. 673,889

4 Claims. (Cl. 188—75)

This invention relates in general to wheel brakes and more particularly refers to ventilated wheel brakes suitable for motor vehicles.

The primary object of the invention is the provision of an improved ventilated wheel brake having a wheel and a brake associated therewith and constructed to effect by rotation of the wheel continuous flow of ventilating air through the brake drum and brake shoe of the brake.

Another object of the invention is the provision of an improved ventilated wheel brake of the type referred to which embodies an external brake having a brake drum associated with the hub of the wheel and brake shoes associated with the axle structure mounting the wheel.

A further object of the invention is the provision of an improved ventilated wheel brake of the type referred to, in which the hub of the wheel is shaped to include a chambered brake drum having peripheral braking surface of V-shaped outline, in which the brake shoes have V-shaped cross section and in which the brake drum has its braking surface provided with circumferentially arranged passages adapted to direct flow of ventilating air toward the brake shoes.

Still another object of the invention is the provision of a wheel brake of the type referred to, in which the peripheral V-shaped braking surface of the brake drum embodies ventilating passages intersecting the apex of the V-shaped braking surface, and in which the V-shaped brake shoes include passages intersecting the apexes of the braking surfaces of these brake shoes to direct flow of ventilating air from the chamber of the brake drum through the ventilating passages toward the friction surfaces of the brake drum and the brake shoes and then permit escape of such ventilating air through ventilating passages in the brake shoes.

Still further objects of the invention lie in the provision of wheel brakes of the type referred to, with specifically constructed brake drums and brake shoes associated with each other for simplified and proper ventilation of both the brake drums and brake shoes.

Additional other objects and novel features of construction, combinations and relations of parts by which the objects in view have been attained will appear and are set forth in detail in the cause of the following specification. The drawings accompanying and forming part of the specification illustrate a certain practical embodiment of the invention, but it will be apparent as the specification proceeds that the structure may be modified and changed in various ways without departure from the true spirit and broad scope of the invention.

Figure 1:
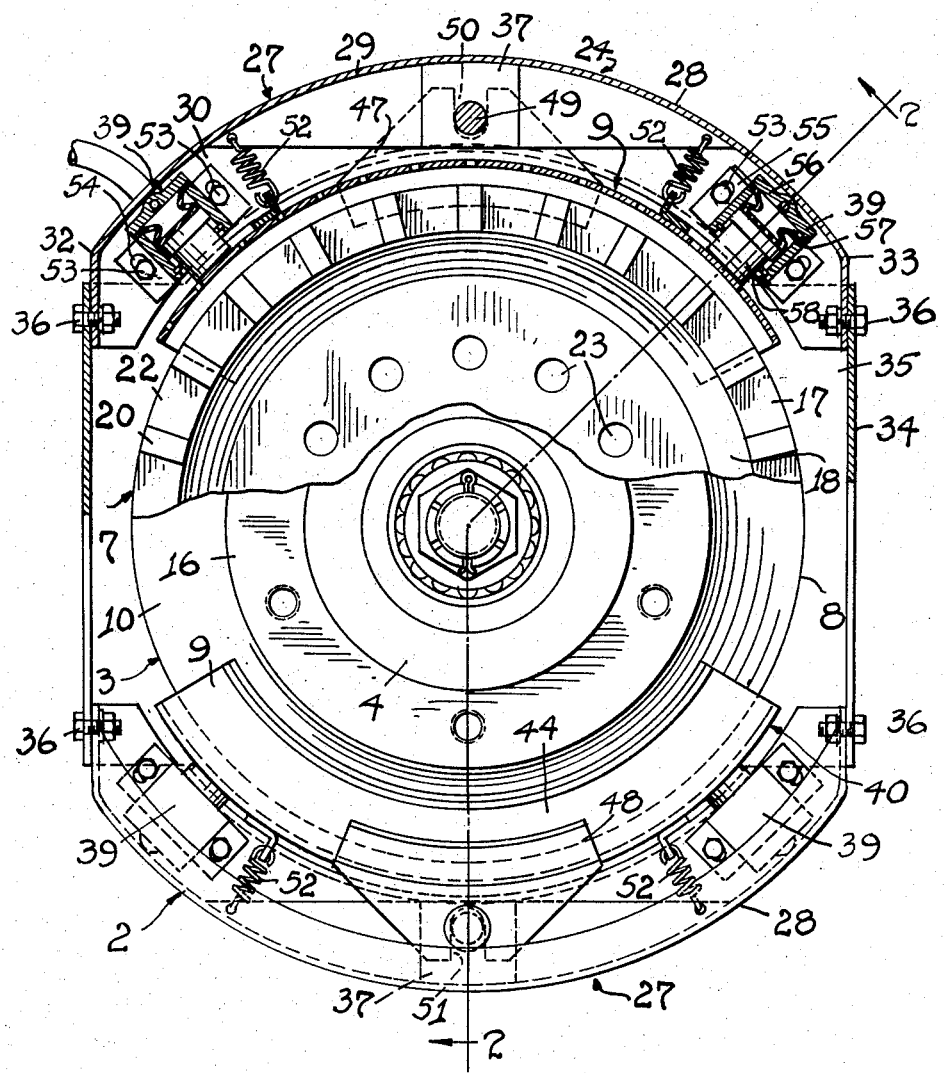
Fig. 1 is a front view, partly in section, of a wheel brake constructed in accordance with the invention, the wheel brake being shown with its tire rim removed.
Figure 2:
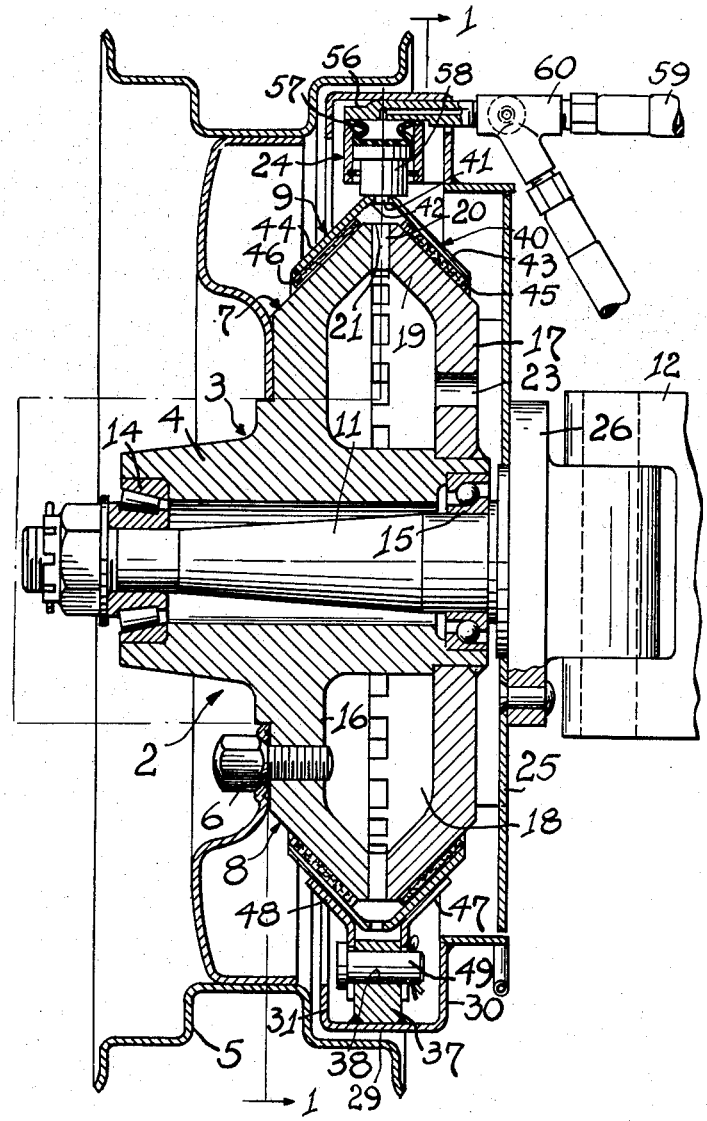
Fig. 2 is a sectional view through the wheel brake shown in Fig. 1, the section being taken on line 2—2 of Fig. 1.
Figure 3:
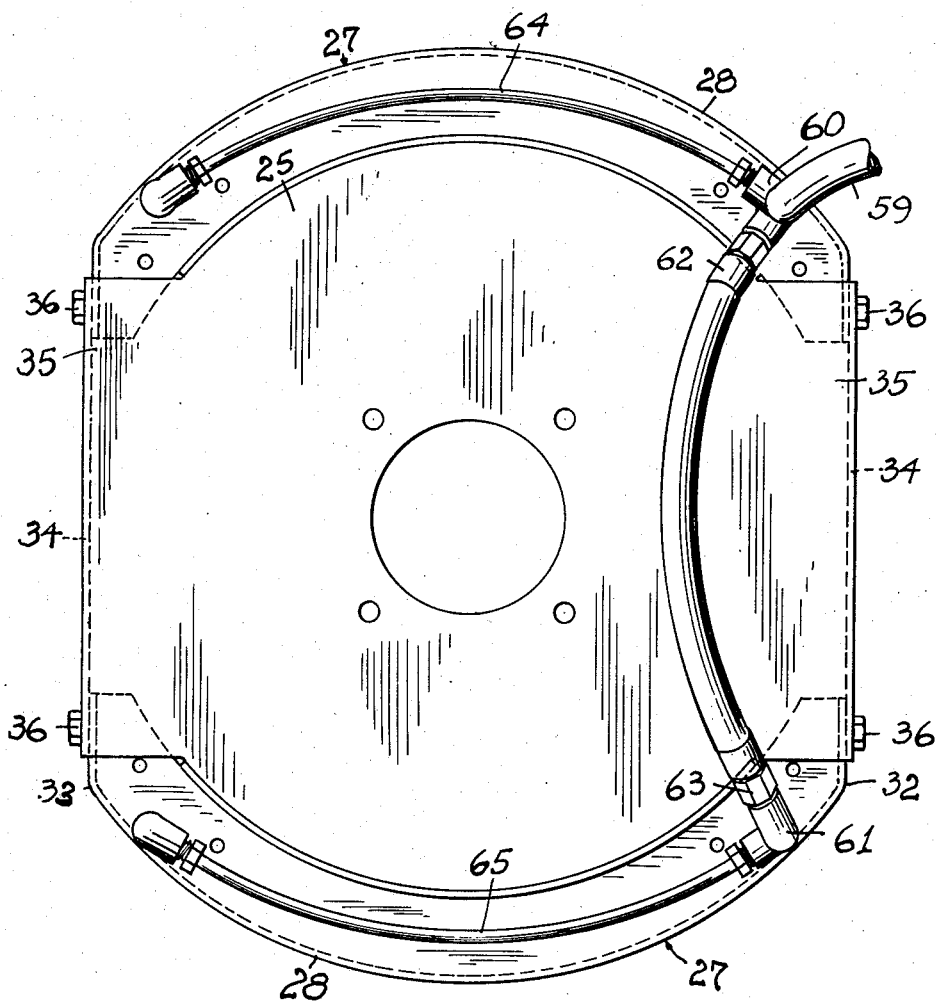
Fig. 3 is a rear view of the brake shield of the wheel brake shown in Fig. 1.

Referring more particularly to the exemplified form of the invention shown in the drawings, reference numeral 2 denotes a wheel brake, the body 3 of which includes a hub 4, a tire rim 5 attached to hub 4 by screws 6 and a brake arrangement 7 with a brake drum 8 and brake shoes 9 frictionally cooperating with outer peripheral braking surface 10 of brake drum 8.

Body 3 has hub 4 rotatably mounted on knuckle 11 of axle 12 by roller and ball bearings 14 and 15 and includes a circumferential cup-shaped flange 16 and a circumferential cup-shaped cover 17 abutting flange 16 and attached thereto in any suitable manner. Cup-shaped flange 16 and cover 17 form brake drum 8 embodying a ring-shaped chamber 18, the peripheral wall 19 of which is of V-shaped section and provides brake drum 8 with a V-shaped braking surface. The peripheral wall 19 includes a plurality of radial passages 20 intersecting the apex 21 of V-shaped braking surface 10, which passages are formed by notching circumferential edge 22 of cover 17. Chamber 18 of brake drum 8 includes, in addition to passages 20, passages 23 which are arranged in cover 17 to permit ventilating air to enter into the chamber through passages 23 and to be discharged therefrom through passages 20.

The thus constructed brake drum 8 cooperates with diagonally opposed brake shoe assemblies 24 removably attached to brake shield 25 in turn secured to flange 26 of knuckle 11. Brake shoe assemblies 24 being identical in construction, description of but one of these brake shoe assemblies is deemed sufficient.

Brake shoe assembly 24 embodies a base 27 having the form of a U-shaped curved channel section 28 with a curved web 29 and side flanges 30, 31. Curved web 29 has its end portions bent inwardly at 32, 33 for alignment with flanges 34 of extensions 35 of brake shield 25 and is secured to the flanges 34 by bolts 36. Channel section 28 mounts centrally on its curved web 29 a pivot block 37 having a bore 38 and adjustably supports on side flange 30 two hydraulic cylinders 39 which are arranged in symmetrical relation to bore 38 of pivot block 37. In addition, channel section 28 pivotally and slidably supports brake shoe 9 which has substantially V-shaped cross section for cooperating with V-shaped braking surface 10 of brake drum 8. Brake shoe 9 has its V-shaped body 40 provided with radial passages 41 aligned with apex 42 of the body and supports on wing portions 43, 44 of body 40 brake linings 45, 46. Body 40 is pivotally and slidably coupled with pivot block 37 by symmetrically opposed angular plates 47, 48 welded to central areas of wing portions 43, 44, which angular plates are pivotally and slidably engaged with an anchor pin 49 arranged in pivot block 37 and extended through elongated slots 50, 51 in angular plates 47, 48. Brake shoe assemblies 24 which can readily be demounted by disconnection of bolts 36 yieldingly withdraw brake shoes 9 from braking surface 10 of brake drum 8 by tension springs 52 symmetrically and yieldingly connecting V-shaped body 40 of brake shoe 9 with base 27.

Shifting of brake shoes 9 into contact with braking surface 10 of brake drum 8 is effected by hydraulic cylinders 39 which by bolts 53 are adjustably secured to side flanges 30, the bolts 53 being extended through elongated slots 54 in base plates 55 of the hydraulic cylinders. These hydraulic cylinders embody cylinder portions 56 and piston portions 57 having block-shaped extensions 58 arranged to contact the somewhat flattened apex 42 of V-shaped body 40 and effect shifting of the brake shoes toward braking surface 10 against the force of tension springs 52 when fluid under pressure is fed into cylinder portions 56 of hydraulic cylinders 39 through pressure hose 59 connected by fittings 60, 61, hose couplings 62, 63 and pipe sections 64, 65 with the cylinder portions 56.

Rotation of wheel brake 2 effects by centrifugal force continuous flow of ventilating air through passage 23 into ring-shaped chamber 18, out of chamber 18 through radial passages 20 toward brake shoes 9 and braking surface 10, and through radial passages 41 and the space between brake shoes 9 and braking surface 10 out of the wheel brake into the open atmosphere. This continuous flow of ventilating air cools the brake drum, its braking surface and the brake shoes and, in addition, blows out any and all accumulation of dust, oil and water which accidentally should enter into the wheel brake, so that the described ventilating arrangement provides the wheel brake with a continuously cooled and automatically cleaned brake arrangement of highest efficiency.

Having thus described my invention, what I claim is:

1. In a wheel brake a chambered brake drum of V-shaped cross section embodying oppositely arranged cup-shaped members secured to each other to a brake drum having an outer braking surface of V-shaped outline, spaced perforations in the apex of the V-shaped braking surface, other perforations in a side wall of the brake drum communicating with the chambered portion thereof and shiftably supported brake shoes of V-shaped cross section arranged to cooperate with the V-shaped braking surface of the brake drum, each brake shoe including a plurality of perforations in its apex to effect by rotation of the wheel brake continuous cooling of the brake shoes by air entering into the brake drum through said other perforations and discharge therefrom through the perforations in the apexes of the V-shaped braking surface and the brake shoes.

2. A wheel brake as described in claim 1, wherein one of the cup-shaped members of the brake drum embodies a circumferentially nodded outer edge providing the perforations in the apex of the braking surface of the brake drum.

3. In a wheel brake a rotary, chambered, peripherally perforated brake drum with an outer braking surface of frusto-conical outline having the perforations arranged in the circumferential apex of the brake drum, and stationary brake shoe assemblies encircling the brake drum and each including a single, radially shiftable, perforated brake shoe of V-shaped cross section, each brake shoe having its perforations aligned with the perforations of the chambered brake drum, said perforations cooperating in effecting cooling of the brake shoes by air discharged from the brake drum through its perforations and the perforations of the brake shoes.

4. A wheel brake comprising a hub, a chambered brake drum including a peripheral, perforated wall portion of V-shaped cross section forming a circular, frusto-conical braking surface with perforations in the apex thereof and perforated side wall portions, said drum encircling said hub, and stationary brake shoe assemblies each including a single, radially shiftably supported, perforated brake shoe of V-shaped cross section with perforations in the apex thereof adapted to be shifted radially toward and away from the circular, frusto-conical, perforated brake surface of the brake drum, said brake shoes having the perforations aligned with the perforations of the peripheral, perforated wall portion of the brake drum to permit entering of air into the brake drum through the perforated side wall and discharge of air from the brake drum through the perforations in the peripheral wall portion and the perforations in the brake shoes when the wheel brake is rotated.

References Cited in the file of this patent

UNITED STATES PATENTS

| 641,974 | Kingsland | Jan. 23, 1900 |
| 1,937,702 | Keene | Dec. 5, 1933 |
| 2,155,818 | Carnes | Apr. 25, 1939 |
| 2,198,028 | Farmer | Apr. 23, 1940 |
| 2,260,340 | Sauzedde | Oct. 28, 1941 |
| 2,646,862 | Dodge | July 28, 1953 |

FOREIGN PATENTS

| 986,658 | France | Apr. 4, 1951 |
| 1,114,906 | France | Dec. 26, 1955 |